Dec. 9, 1958    R. F. SKINNER    2,863,506
TIRE TRIMMER

Filed July 22, 1954    2 Sheets-Sheet 1

Ray F. Skinner
INVENTOR.

Dec. 9, 1958   R. F. SKINNER   2,863,506
TIRE TRIMMER
Filed July 22, 1954   2 Sheets-Sheet 2
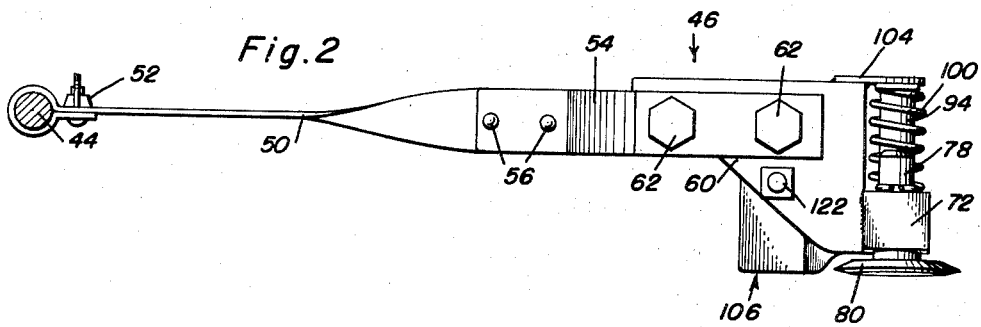
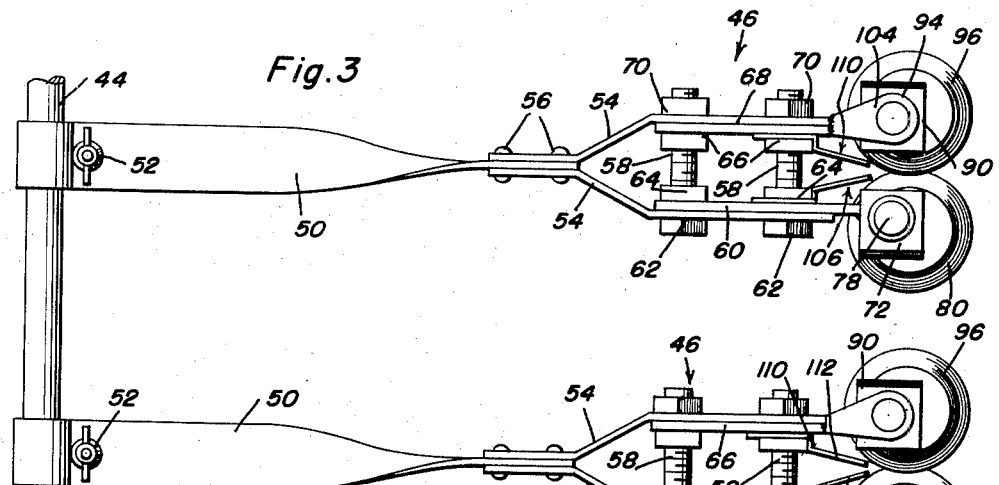
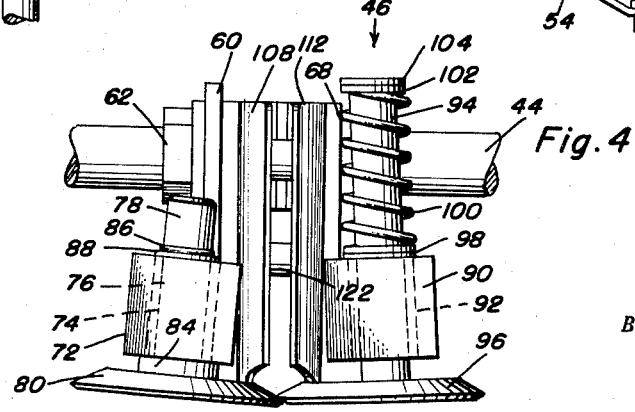
Ray F. Skinner
INVENTOR.

United States Patent Office 2,863,506
Patented Dec. 9, 1958

2,863,506

TIRE TRIMMER

Ray F. Skinner, El Monte, Calif.

Application July 22, 1954, Serial No. 445,058

1 Claim. (Cl. 164—10.2)

This invention relates in general to improvements in trimming devices, and more specifically to an improved tire trimmer.

The molds used for curing automobile tires have vent holes formed therein to let air and moisture escape in order to prevent the improper forming of the treads of the tires or other blemishes. Such vent holes are usually formed in continuous rows completely around the mold on the tread and the side walls and result in the forming of rows of rubber pigtails protruding from the tire, there being one pigtail to each of the vent holes. These rubber pigtails are about one-sixteenth of an inch in diameter and range from one-half inch to one inch in length. It is the primary object of this invention to provide an improved tire trimmer which is so constructed whereby it will cut off these pigtails very close to the surface of the tire in order that a new tire may have a much better appearance.

Another object of this invention is to provide an improved tire trimmer which is so constructed and defined whereby it will closely follow the surface of a tire being trimmed so that an extremely smooth surface tire will result.

Still another object of this invention is to provide an improved tire trimmer which is so constructed whereby cutter blades of the tire trimmer are automatically rotated in response to movement of a tire relative thereto in order that a proper cutting action may be effected.

A further object of this invention is to provide an improved tire trimming machine which includes a suitable support for rotatably mounting a tire and a plurality of tire trimmers, the tire trimmers being aligned with the normal rows of vent openings in a mold for such tire so that all of the pigtails formed on the tire are automatically trimmed off in response to rotation of the tire in the machine.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged vertical sectional view through a supporting shaft for one of the individual tire trimmers and shows the manner in which the individual tire trimmer is supported relative to the supporting shaft;

Figure 3 is an enlarged top plan view of a pair of tire trimmers and shows their relation with respect to each other and to their supporting shaft;

Figure 4 is an enlarged rear elevational view of one of the tire trimmers and shows the general details thereof;

Figure 1:
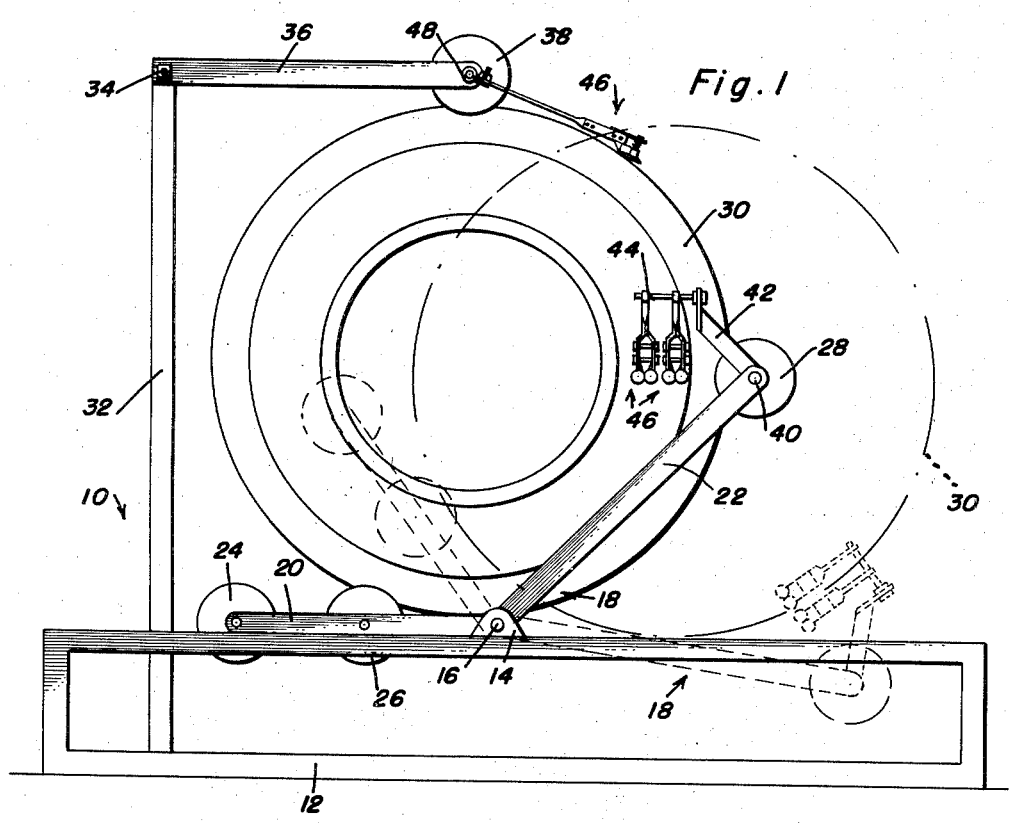
Figure 1 is a schematic elevational view of a machine employing the tire trimmer which is the subject of this invention, the machine providing a suitable support for a tire and rotating the tire relative to the individual tire trimmers, the ejection position of the machine being shown in dotted lines.
Figure 5:
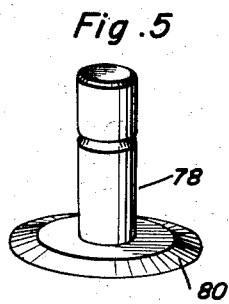
Figure 5 is an enlarged perspective view of one of the cutter blades of the tire trimmer and its associated supporting shaft.

Referring now to Figure 1 in particular, it will be seen that there is illustrated a tire trimming machine which is referred to in general by the reference numeral 10. The tire trimming machine 10 includes a suitable base 12 which has projecting upwardly therefrom ears 14. Extending between the ears 14 is a transverse shaft 16 on which is mounted a support arm assembly which is referred to in general by the reference numeral 18. The support arm assembly 18 includes a pair of angular outline arms disposed in spaced relation, the angular outlined arms including a normally horizontal portion 20 and an upwardly and rearwardly sloping portion 22, the portions 20 and 22 being connected together for movement as a unit. Extending between the forward ends of the horizontal portions 20 is a forward roller 24. A similar roller 26 is rotatably mounted between intermediate parts of the horizontal portions 20. A guide roller 28 is mounted between the upper rear ends of the portions 22 and engage a tire, such as the tire 30, mounted in the tire trimming machine 10 to retain it in place on the roller 26.

In order to further facilitate the positioning of the tire 30, there is extending upwardly from the forward part of the base or supporting frame 12 a standard construction 32 which has pivotally connected to the upper end, as at 34, rearwardly extending, normally horizontally disposed arms 36 which have extending between the rear ends thereof a roller 38. The roller 38 engages the upper portion of the tire 30 to further retain it within the tire trimming machine 10.

The roller 28 is mounted on an axle or shaft 40 which has adjustably secured thereto a forwardly and upwardly extending support arm 42. The support arm 42 is provided with a horizontally disposed shaft 44 which adjustably carries a plurality of individual tire trimmers, the individual tire trimmers being referred to in general by the reference numeral 46. The tire trimmers 46 are so positioned alongside the side wall of the tire 30 to remove pigtails from the side walls thereof as the tire 30 rotates.

The roller 38 is mounted on a shaft or axle 48. Adjustably secured to the shaft 48 is a plurality of additional tire trimming units 46. The tire trimming units 46 carried by the shaft 48 engage the tread of the tire 30 for removing pigtails therefrom.

It is to be understood that one of the rollers 26, 28, or 38, preferably the roller 26, is driven in order to rotate the tire 30. Further, in order to facilitate the ejection of the tire 30 from the tire trimming machine 10, the support arm assembly 18 is pivotally mounted with respect to the pivot pin 16 for clockwise tipping to its dotted line position of Figure 1. When the support arm assembly 18 is so tipped, the roller 24 comes into engagement with the tread of the tire 30 and urges the tire 30 rearwardly to its dotted line position and out of the tire trimming machine 10.

Referring now to Figure 3 in particular, it will be seen that there is illustrated the details of a pair of tire trimming units 46 together with the relationship thereof with respect to their supporting shaft 44. Each of the tire trimming units 46 includes a support arm 50 which is longitudinally twisted and which has a forward portion encircling the shaft 44 and adjustably clamped thereto through the use of an adjustable fastener 52. Secured to the rear end of the support arm 50 is a pair of generally Z-shaped mounting plates 54, as is best illustrated in Figure 3. The mounting plates 54 have their forward ends connected to the rear end of the support arm 50 by suitable rivets 56.

Extending through the rear portions of the mounting plates 56 are elongated externally threaded fasteners 58. The fasteners 58 extend transversely of the mounting plates 54 and therethrough.

Carried by the fasteners 58 in abutting engagement with the inner face of one of the mounting plates 54 is a support plate 60. The fasteners 58 have heads 62 which engage the outer face of the one mounting plate 54 and has adjustably engaged thereon nuts 64 which clamp the support plate 60 to its respective mounting plate 54. Similar nuts 66 are utilized to clamp a second support plate 68 against the inner surface of the other of the mounting plates 54. Additional nuts 70 are carried by the fasteners 58 in clamping engagement with the outer face of the other mounting plate 54.

Carried by the rear end of the support plate 60 is a vertically disposed journal block 72 which is provided with a sleeve bearing 74 having a generally vertical bore 76 therethrough. Mounted within the sleeve bearing 74 is a relatively short shaft 78 which has connected to the lower end thereof a circular cutter blade 80. The cutter blade 80 is spaced from the bottom of the journal block 72 by a suitable spacing washer 84 and is vertically positioned with respect to the journal block 72 by a snap locking ring 86 removably carried by the shaft 78. Disposed between the locking ring 86 in the upper part of the journal block 72 is a suitable washer 88.

The support plate 68, which is identical with the support plate 60, has secured to the rear end thereof a journal block 90 which is very similar to the mounting block 72 and has disposed therein a vertically disposed sleeve bearing 92. Slidably and rotatably mounted within the sleeve bearing 92 is an elongated shaft 94 which has carried at the lower end thereof a circular cutter blade 96 which is identical with the cutter blade 80. Overlying the journal block 90 is a washer 98 which has bearing thereagainst a coil spring 100 carried by the upper portion of the shaft 94. The upper end of the coil spring 100 is in engagement with a washer 102 which is in turn in abutting engagement with the underside of a retaining plate 104 suitably secured to the support plate 68, as is best illustrated in Figure 3.

It is to be noted that the journal blocks 72 and 90 are disposed at slight angles to the vertical so that the shafts 78 and 94 diverge downwardly. This results in the cutter blades 80 and 96 converging downwardly and inwardly so that only adjacent edge portions of the cutter blades 80 and 96 lie in the plane of their meeting.

Clamped to the inner surface of the support plate 60 by the nut 64 of the rearmost fastening 58 is a guide plate which is referred to in general by the reference numeral 106. The guide plate 106 has a rear guide portion 108 which is directed toward the intersection between the blades 80 and 96.

A guide plate which is referred to in general by the reference numeral 110 is clamped against the inner face of the support plate 68 by the nut 66 of the rearmost fastener 58. The guide plate 110 is identical with the guide plate 106 with the exception that it is a right-hand version of the guide plate 106. The guide plate 110 includes a guide portion 112 which is rearwardly disposed and directed toward the intersection between the cutter blades 80 and 96.

Figures 6, 7:
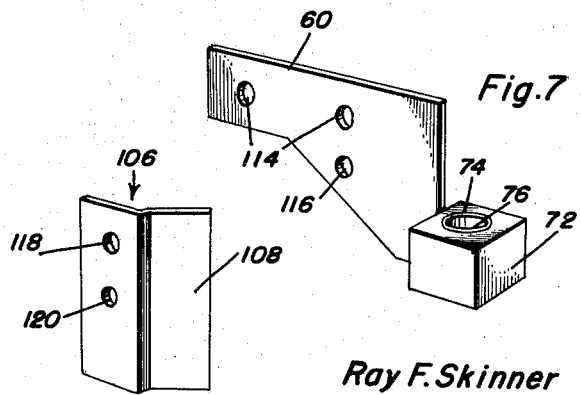
Figure 6 is an enlarged perspective view of the guide plate of one of the tire trimmers.
Figure 7 is an enlarged perspective view of a journal block and support plate of one of the tire trimmers.

Referring now to Figure 7 in particular, it will be seen that the support plate 60 is provided with a pair of horizontally spaced apertures 114 for receiving the fasteners 58. The support plate 68 is provided with similar apertures. The support plates 60 and 68 are provided with an additional aperture 116 disposed in vertical alignment, but spaced therebelow, with the rearmost one of the apertures 114. The guide plates 106 and 110 are provided with vertically spaced apertures 118 and 120 which are aligned with the rearmost aperture 114 and the aperture 116 of each of the support plates 60 and 68. Extending through the apertures 116 and 120 is an additional fastener 122, as is best illustrated in Figure 2, which prevents rotation of the guide plates 106 and 110.

In the operation of the individual tire trimmer 46, the tire trimmer 46 is adjustably positioned with respect to a tire, such as the tire 30, by loosening the fastener 52 and placing the support arm 50 in the proper position with respect to its support shaft 44. When the tire trimmer 46 is properly positioned, the undersides of the cutter blades 80 and 96 at the points of their contact engage the surface of the tire to be trimmed and as the tire is rotated, the cutter blades 80 and 96 are similarly rotated. As the tire to be trimmed rotates, the pigtails (not shown) move in between the guide plates 106 and 110 and are directed between the cutter blades 80 and 96 and cut off thereby. Inasmuch as the cutter blade 96 is resiliently mounted for vertical movement, in the event such matter as cannot be cut by the cutter blades 80 and 96 enter therebetween, the cutter blade 96 may move vertically so as to clear the obstacle.

Although only two tire trimmers 46 have been illustrated in a single group, it is to be understood that any desired number of tire trimmers 46 may be carried by each of the supporting shafts, such as the shafts 44 and 48. It is to be understood that there will be provided one tire trimmer 46 for each row of pigtails to be removed. Further, it is to be understood that the arrangement of the tire trimmers 46 illustrated in Figure 1 may be varied as desired to produce the greatest effect.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A tire trimming machine comprising a supporting frame, drive means carried by said frame freely rotatably supporting a tire, support arms carried by said frame on opposite sides of said tire, guide means carried by said support arms for retaining a tire in place on said drive means, said support arms being pivotally mounted on said supporting frame to ensure engagement of said guide means with a tire, at least one tire trimmer carried by each of said support arms, each of said tire trimmers being engageable with a tire carried by said drive means and driven in response to rotation of a tire by engagement with the tire, each tire trimmer including a pair of support plates, means retaining said support plates in spaced relation, journal blocks carried by said support plates, shafts rotatably journaled in said journal blocks, rotatable blades carried by said shafts in overlapping cooperation relation, one of said shafts being longitudinally fixed, the other of said shafts being resiliently mounted relative to its journal block for movement therethrough, whereby separation of said blades when striking an obstacle is permitted.

References Cited in the file of this patent
UNITED STATES PATENTS

| | | |
|---|---|---|
| 703,213 | Parcells | June 24, 1902 |
| 1,928,868 | Poen | Oct. 3, 1933 |
| 1,940,106 | Snyder | Dec. 19, 1933 |

(Other references on following page)

UNITED STATES PATENTS

| | | | |
|---|---|---|---|
| 1,945,883 | Connelly _____ Feb. 6, 1934 | 2,581,928 | Broden _____ Jan. 8, 1952 |
| 1,967,262 | Robinson et al. _____ July 24, 1934 | 2,599,267 | Lewin _____ June 3, 1952 |
| 2,099,458 | Althen _____ Nov. 16, 1937 | 2,603,290 | Lindemann _____ July 15, 1952 |
| 2,149,010 | Errig et al. _____ Feb. 28, 1939 | 2,606,416 | Bruner _____ Aug. 13, 1952 |
| 2,187,833 | Lock _____ Jan. 23, 1940 | 2,606,612 | Dinnan _____ Aug. 12, 1952 |
| 2,486,786 | Holtshauser _____ Nov. 1, 1949 | 2,681,108 | Chanyi _____ June 15, 1954 |
| 2,524,489 | Strong _____ Oct. 3, 1950 | 2,696,657 | Constantakis _____ Dec. 14, 1954 |
| | | 2,733,765 | Holroyd et al. _____ Feb. 7, 1956 |